Aug. 15, 1944.   F. HOFBAUER   2,355,865
ROTARY CUTTER
Filed Feb. 7, 1944   2 Sheets-Sheet 1
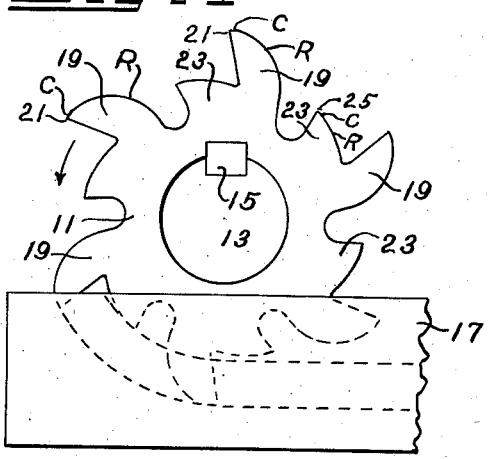
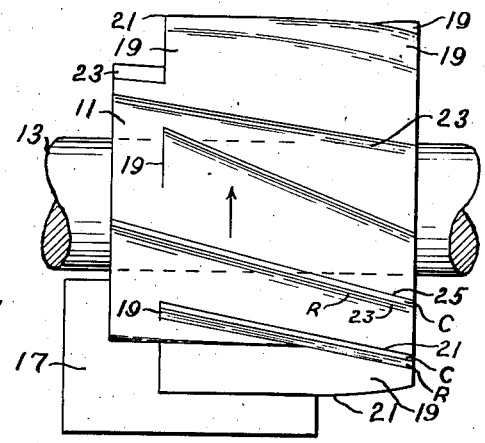
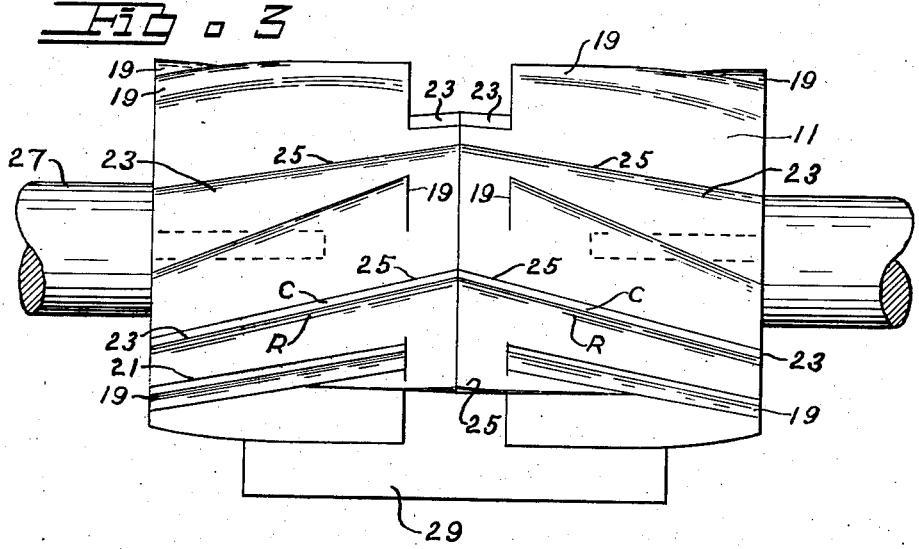
INVENTOR
FRANK HOFBAUER
BY
ATTORNEY

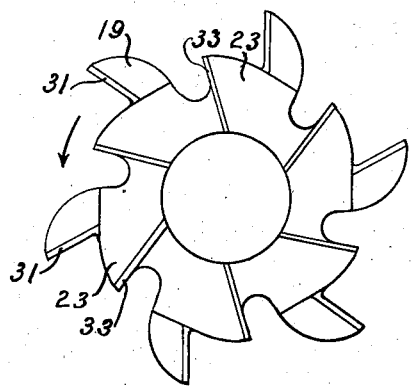
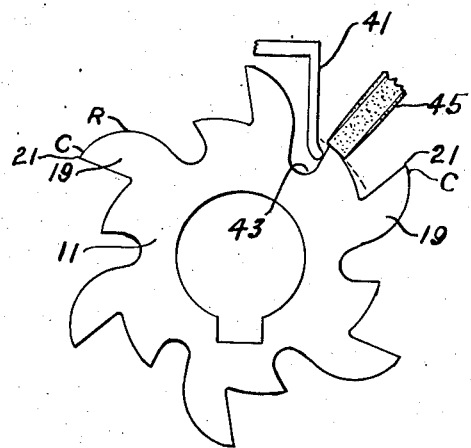
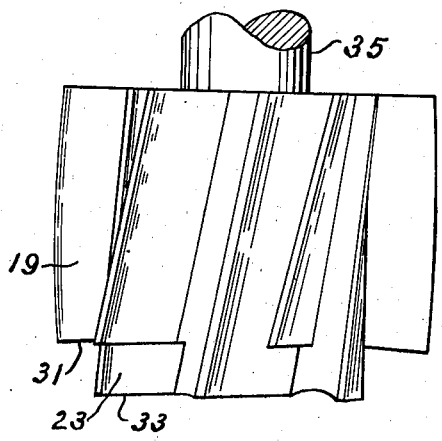
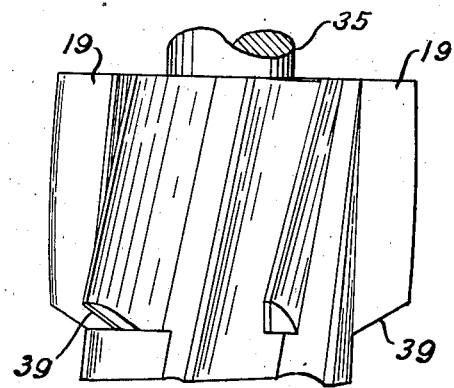

Patented Aug. 15, 1944

2,355,865

UNITED STATES PATENT OFFICE 2,355,865

ROTARY CUTTER

Frank Hofbauer, Detroit, Mich.

Application February 7, 1944, Serial No. 521,455

10 Claims. (Cl. 29—103)

My invention pertains to rotary chip cutting tools and more particularly it pertains to milling cutters, end mills, and similar rotary tools for machining metals and other materials.

It is also an object of my invention to provide improved rotary cutting tool having a longer useful life and which maintains its dimensions more accurately throughout its useful life.

It is also an object of my invention provide improved rotary cutting tools which are conveniently adaptable to perform a variety of machining operations.

It is a further object of my invention to provide improved rotary tools which simplify and save time on setting up machines for jobs on production.

Further objects and advantages are within the scope of the invention, such as relate to the arrangement, operation and function of the related elements of the structure, to various details of construction and to combinations of parts, elements per se, and numerous other features as will be apparent from a consideration of the specification in conjunction with the appended drawings disclosing specific embodiments of the invention, in which:

Fig. 1 is an end elevational view showing one of my improved rotary cutters in operative association with a work piece;

Fig. 2 is a side elevational view thereof;

Fig. 3 is a side elevational view showing a complementary pair of such rotary cutters mounted in a suitable cooperative relation for simultaneous operation on a work piece;

Fig. 4 is an end elevational view showing another embodiment of the improved rotary cutter adapted for operation as an "end mill";

Fig. 5 is a side elevational view of the cutter of Fig. 4 mounted on a vertical shaft;

Fig. 6 is a side elevational view showing another embodiment of the improved rotary cutter; and Fig. 7 is an end elevational view, partially diagrammatic showing how a circle ground or cylindrical surface may be applied on the surface of a sub-land which follows immediately after the cutting edge.

Referring more specifically to Figs. 1 and 2, my improved rotary cutter comprises a body 11 having an aperture extending suitably therethrough for mounting upon an arbor or shaft 13 where it may be secured by a standard keyway and key 15, or in any suitable manner, for support and rotation in engagement with a work piece 17 which is to be modified. A set of teeth 19 project out from the body and present outwardly exposed cutting edges 21 equally spaced circumferentially and of a uniformly equal radius throughout corresponding to the maximum working radius desired. Following immediately after each cutting edge 21 is a surface C of a circle ground on cylindrical conformation having a radius substantially equal to the radius of the cutting edge about the axis of rotation of the tool. The tooth surfaces following the cylindrical or circle ground portions C, and designated R, are relieved throughout the portions which are further retarded or lagging in accordance with usual practise with milling cutters. Teeth 19, and the cutting edges thereby presented, are disposed along and around the tool body in a substantially helical fashion to impress a combination of axial and circumferential shearing stress upon the worked material.

A second set of teeth 23 are provided, projecting out from the body between the first mentioned teeth 19, presenting outwardly exposed cutting edges 25 having a smaller radius around the axis of rotation than the first teeth 19. The second set of teeth and cutting edges of smaller radius extend along the body and project therefrom in a manner similar to the first teeth 19 except that the teeth 23 of this second set extend further axially projecting out from between the larger teeth for operative engagement with material to be worked at one end of the body. Each tooth 23, of this second set, is provided with an outer surface C of a circle ground on cylindrical conformation immediately following the cutting edge 25, and a relieved surface R thereafter, just as in the first set of teeth 19 of the larger radius. Also the teeth 23 of the smaller radius are provided with such following surfaces C and R and are of the predetermined desired radius uniformly throughout the entire length of each tooth so that as the tool is sharpened and used back from the end, these sub-land surfaces become progressively effective, and the dimensions initially established are effective throughout the life of the tool.

A complementary cooperative pair of such rotary cutting tools 11 is provided by making one similarly as previously described and by making the complementary tool having the elongated teeth 23 of the smaller radii project out for operative engagement at the opposite end of the tool, as in Fig. 3, and by disposing the helical teeth 19 and 23 in reversely inclined relation on the tool body, as shown. As viewed in Fig. 3, the longer teeth 23 of the smaller radius project from the right hand end of one of the tools while the other tool has these projecting from the left hand end. In use, such a complementary pair of composite rotary cutters are secured upon a single shaft in an end to end abutting relation with the projecting ends of the smaller teeth of the two cutters in adjacent abutting engagement. The two cutters are secured firmly upon the shaft 27 in any suitable manner, as by keys shown dotted. Such a pair of complementary rotary cutters may be applied to perform simultaneously a plurality of different operations upon a work piece 29, as shown in Fig. 3. Although six teeth are shown in each set of teeth it is to be understood that the number of teeth provided on any of my improved rotary cutters may be varied to suit the size of the tool and the material.

Figs. 4 and 5 show how my improved rotary composite cutter may be conveniently adapted, to provide cutting end edges 31 and 33 extending in from the cutting edges 19 and 23. This is accomplished by grinding the small extended end and grinding back and relieving the following end surfaces. Such a tool may be secured upon the end of a vertical shaft 35, as in a drill press for example, for convenient use in a manner rather similar to an "end mill." The cutting edges of increasing radii successively engage and modify the material being worked as the tool enters the material. A greater number of steps of increasing radius may be provided as desired.

Fig. 6 shows how the work engaging ends of the larger teeth 19 may be inclined, instead of projecting at right angles to the axis of the tool, for presenting tapering cutting edges 39. Also the lowest end cutting edges may be similarly tapered if desired, as will be readily understood.

The circle ground on cylindrical surfaces C may be conveniently provided following the cutting edges of the teeth 19 of larger radius by O. D. grinding in a well known manner on any suitable grinder. The relieved surfaces R, and the circle ground surfaces C on the smaller teeth, may be conveniently accomplished by the well known principle of "spiral" grinding, as represented in Fig. 7, by inserting a positioning finger 41 into a helical flute 43 to suitably turn and hold the tool 11, as it is moved axially, in engagement with a suitably conformed grinding wheel 45 to provide the circle ground surface conformed as represented by the dotted line. And the relieved surfaces may be similarly formed for operatively exposing the cutting edges.

It is apparent that within the scope of my invention modifications and different arrangements may be made other than herein disclosed, and the present disclosure is illustrative merely, the invention comprehending variations thereof.

I claim:

1. A composite milling cutter comprising, a body of a substantially cylindrical conformation having an aperture extending therethrough suitably for mounting upon a shaft for support and rotation, a first set of teeth projecting out from said body and presenting outwardly exposed cutting edges of a substantially equal radius around the axis of rotation of the body, a second set of teeth projecting out from said body between said first set of teeth and presenting exposed cutting edges of a substantially equal radius smaller than the radius of the first mentioned set of teeth, and said second set of teeth of the smaller radius extending along said body between the teeth of the first set and projecting out from between the teeth of the first set at one end of the body for operative engagement with material to be worked.

2. A milling cutter comprising, a body of a conformation having an aperture extending therethrough suitable for mounting for support and rotation upon a shaft, a plurality of teeth extending out from said body and presenting outwardly exposed cutting edges circumferentially spaced and of substantially equal radii, said teeth and cutting edges being disposed along and around said body in a substantially helical fashion to impress a combination of axial and circumferential shearing stress upon worked material, a second set of teeth projecting out from said body between said first mentioned teeth and presenting cutting edges of substantially equal radii smaller than the radii of said first mentioned teeth, and said second set of teeth and cutting edges being disposed along said body in a substantially helical fashion similarly to said first mentioned teeth except that the second set of teeth extend further axially along the body for operative exposure at one end.

3. In a composite rotary cutter, a body having an aperture extending therethrough suitable for mounting upon a shaft for support and rotation, a first set of teeth projecting out from said body and presenting outwardly exposed cutting edges of a substantially equal radius around the axis of rotation of the body, a second set of teeth projecting out from said body between said first set of teeth and presenting exposed cutting edges of a substantially equal radius smaller than the radius of the first mentioned set of teeth, and said second set of teeth of the smaller radius extending along said body between the larger teeth of the first set and projecting out from between the teeth of the first set at one end of the body for operative engagement with material to be worked, and each of said teeth having a surface following adjacent its cutting edge of a conformation which is circle ground around the axis of rotation of said body and a relieved surface following the circle ground surface.

4. A composite milling cutter comprising, a body of a conformation having an aperture extending therethrough suitable for mounting for support and rotation upon a shaft, a plurality of teeth extending out from said body and presenting outwardly exposed cutting edges circumferentially spaced and of a substantially equal radius around the axis of rotation of the body, said teeth and cutting edges being disposed along and around said body in a substantially helical fashion to impress a combination of axial and circumferential shearing stress upon worked material, a second set of teeth projecting out from said body between said first mentioned teeth and presenting cutting edges of substantially equal radii smaller than the radii of said first mentioned teeth, said second set of teeth and cutting edges being disposed along said body in a substantially helical fashion similarly to said first mentioned teeth except that the second set of teeth extend further axially along the body for operative exposure at one end, and each of said teeth having an outer surface of a substantially cylindrical conformation around the axis of rotation of the body following adjacent its cutting edge and a relieved surface following the cylindrical surface.

5. A complementary pair of rotary cutters comprising, a first body of a substantially cylindrical conformation having an aperture extending therethrough suitable for mounting upon a shaft for support and rotation, a first set of teeth projecting from said body and presenting outwardly exposed cutting edges of substantially equal radii from the axis of rotation of the body, a second set of teeth projecting from said body between the teeth of said first set and presenting exposed cutting edges equal to a radius smaller than the radius of said first set, the second set of teeth of smaller radius extending along the body between the teeth of the first set and projecting from between the larger teeth of the first set at the left hand end of the body for operative engagement with material to be worked, a second body of a conformation similar to that of said first body with a mounting aperture extending similarly therethrough, a first set of teeth on said body presenting cutting edges similarly to the first set on the first body and of a similar radius, a second set of teeth on said second body present cutting edges similarly to the second set of teeth on the first body except that these project for operative exposure from the right hand end of said second body for engagement upon material to be worked.

6. The pair of complementary rotary cutters in accordance with claim 5, and a shaft extending through the apertures in said pair of bodies and relatively securing said bodies for simultaneous rotation with the left hand end of the first body adjacent the right hand end of the second body.

7. A complementary pair of milling cutters comprising, a first body of a substantially cylindrical conformation having an aperture extending therethrough suitable for mounting upon a shaft for support and rotation, a first set of teeth projecting from said body and presenting outwardly exposed cutting edges of substantially equal radii from the axis of rotation of the body, a second set of teeth projecting from said body between the teeth of said first set and presenting exposed cutting edges equal to a radius smaller than the radius of said first set, the second set of teeth of smaller radius extending along the body between the teeth of the first set and projecting from between the larger teeth of the first set at the left hand end of the body for operative engagement with material to be worked, a second body of a conformation similar to that of said first body with a mounting aperture extending similarly therethrough, a first set of teeth on said body presenting cutting edges similarly to the first set on the first body and of a similar radius, a second set of teeth on said second body present cutting edges similarly to the second set of teeth on the first body except that these project for operative exposure from the right hand end of said second body for engagement upon material to be worked, the teeth of the two sets of teeth on said first body being disposed in a substantially helical fashion to impress a combination of axial and circumferential shearing stress upon worked material, the teeth of the two sets of teeth on said second body being disposed in a reverse helical fashion, and each of the teeth having a surface following adjacent its cutting edge of a conformation which is substantially cylindrical around the axis of rotation of said body and a relieved surface following each such cylindrical surface.

8. The pair of complementary milling cutters in accordance with claim 7, and a shaft extending through the apertures in said pair of bodies and relatively securing said bodies for simultaneous rotation with the left hand end of the first body adjacent the right hand end of the second body.

9. A composite rotary cutter in accordance with claim 3 and further characterized by said teeth being disposed along said body in a substantially helical fashion to impress a combination of axial and circumferential shearing stress upon worked material, and the projecting ends of the teeth of the smaller radius having cutting edges thereon.

10. A composite rotary cutter in accordance with claim 3 and further characterized by the ends of the teeth of the larger radius terminating in axially spaced relation from the projecting ends of the smaller teeth and presenting tapering cutting edges.

FRANK HOFBAUER.